Feb. 8, 1927.

P. S. MORGAN 1,616,540

SHOCK ABSORBING MECHANISM

Filed Aug. 21, 1922     3 Sheets-Sheet 1

Inventor
Porter S. Morgan.
By his Attorneys
Emery, Booth, Janney & Varney

Feb. 8, 1927.

P. S. MORGAN 1,616,540

SHOCK ABSORBING MECHANISM

Filed Aug. 21, 1922    3 Sheets-Sheet 3

Inventor
Porter S. Morgan.
By his Attorneys
Emery, Booth, Janney & Varney

Patented Feb. 8, 1927.

1,616,540

UNITED STATES PATENT OFFICE.

PORTER S. MORGAN, OF NORWALK, CONNECTICUT, ASSIGNOR TO MORGAN BLODGETT MORGAN, INC., OF NEW YORK, N. Y., A CORPORATION OF NEW YORK.

SHOCK-ABSORBING MECHANISM.

Application filed August 21, 1922. Serial No. 583,308.

This invention relates to improvements in shock-absorbing mechanisms. Among the objects of the invention are the production of a compact device, easy to manufacture, assemble and install, constructed to withstand the high pressures consequent upon its operation, susceptible of ready adjustment without the necessity of detaching or disassembling, and to be so mounted and arranged as to require the least practicable space; together with numerous other valuable features of construction, operation and arrangement not heretofore obtained in previous devices of this class.

The accompanying drawings illustrate one selected embodiment of the invention, wherein—

Figure 1:
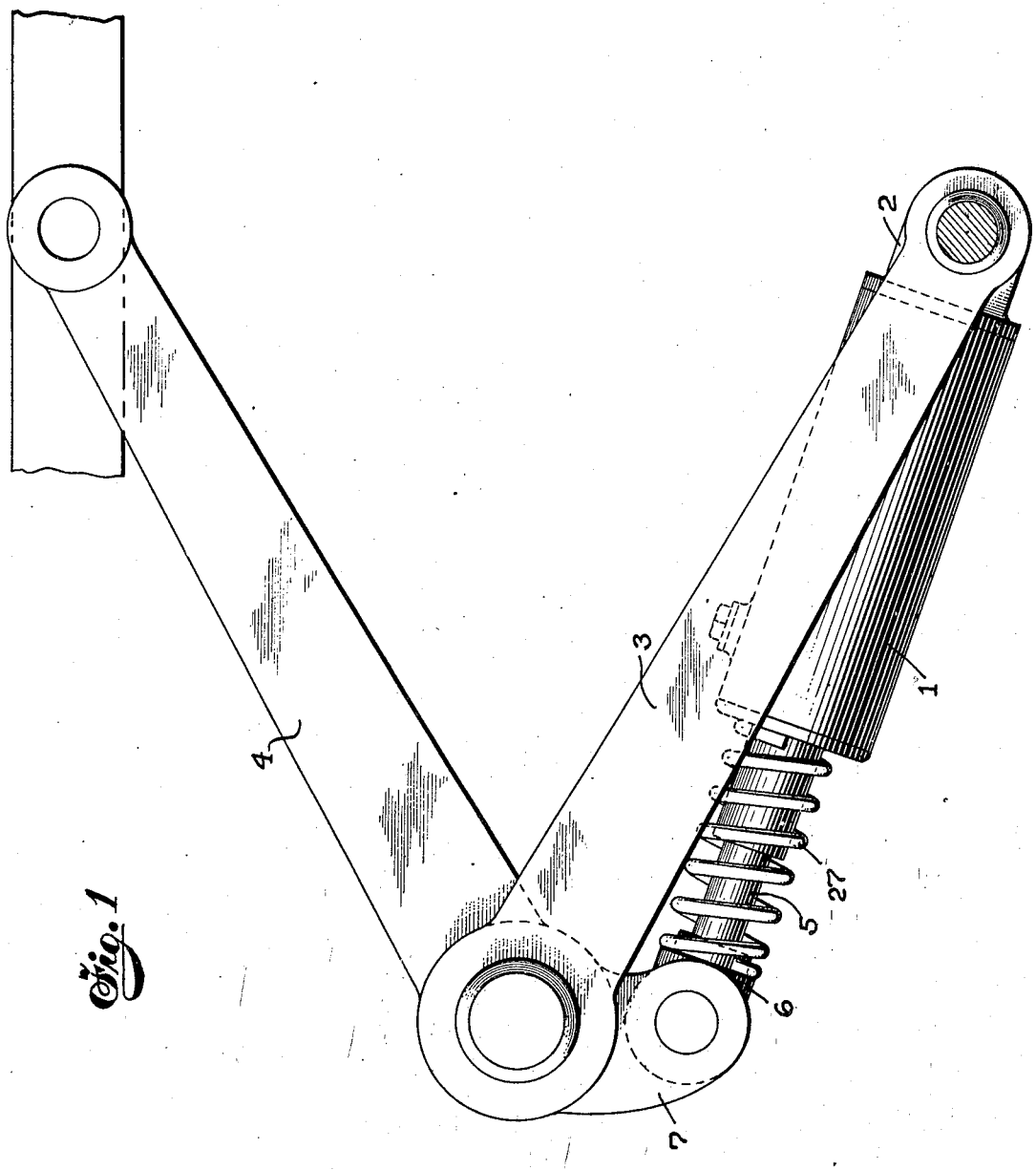
Figure 1 shows upon a somewhat reduced scale a side elevation of the absorber proper and its interconnected mechanism.
Figure 2:
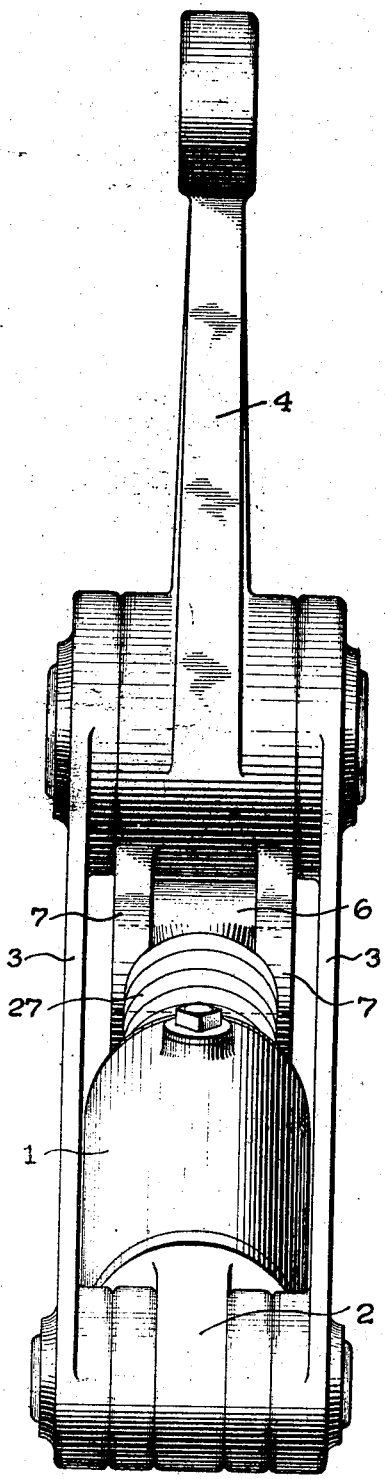
Figure 2 shows, in full size, a perspective view thereof.

Referring particularly to Figure 1, the shock absorber proper is cylindrical in shape, its working parts being contained within a casing 1, the lower end of which, 2, is pivoted in any suitable manner to the axle of the vehicle. The absorber proper lies between a pair of arms 3, pivoted to the axle and also pivoted to the arm 4, the free end of which is pivoted to the chassis or frame of the vehicle.

Entering one end of the cylinder 1 is the piston rod 5, which is provided with a head 6 pivoted to the extension 7 of the arm 4, with the result that relative movement between the arms 3 and 4 results in corresponding movements of the piston rod 5 into and out of the cylinder 1.

Figure 3:
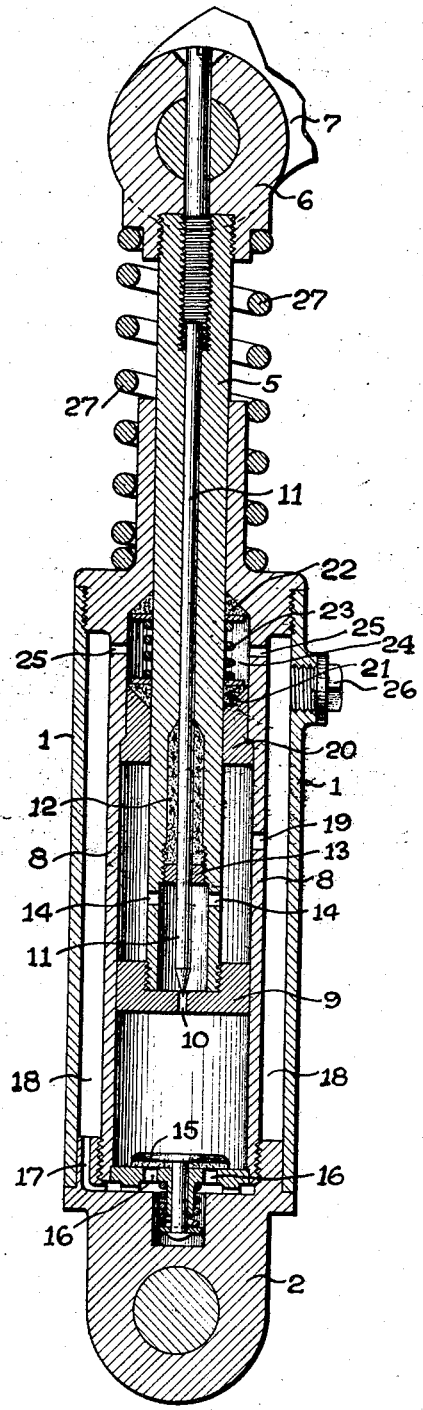
Figure 3 is a cross section taken on the line 3—3 of Figure 2.

Referring particularly to Figure 3 for the interior construction and operation of the absorber proper, the casing 1 surrounds an interior cylinder 8, which may be termed the pressure cylinder, and the interior of which may be designated the pressure chamber, into which projects the piston rod 5, which has at its inner end the piston 9.

The piston 9 is provided with a central opening 10 which may be adjustably restricted by means of the pointed spindle 11. The spindle is disposed in a central longitudinal bore extending throughout the length of the piston rod 5, and has a screw-thread engagement with the piston rod at its outer end. The spindle 11 projects through the head 6 to permit manual adjustment by turning, a slot being provided in the outer end of the spindle for this purpose.

The inner end of the piston rod 5 is made hollow to provide space for an annular packing 12 surrounding the spindle and held in place by the gland 13, below which are two openings 14 through the hollow piston rod, establishing free communication between the interior of the pressure chamber back of the piston, through the piston opening 10 to the other side of the piston.

At the lower end of the pressure chamber is an inwardly-opening, spring-closed valve 15, covering apertures 16 which communicate through the passages 17 with the space 18 between the casing 1 and the cylinder 8, which may be called the auxiliary chamber. This auxiliary chamber also communicates with the pressure chamber behind the piston 9 by means of the opening 19.

The upper end of the pressure chamber is closed by a terminal collar or annular gland 20 surrounding the piston 5. This gland 20 is adapted to embrace and support one of a pair of packing rings 21 and 22 held in position by a pressure spring 23 disposed between them, the surrounding parts being shaped to provide a chamber or trap 24 which communicates with the auxiliary chamber 18 by the passages 25.

On the side of the cylinder 1 is provided a usual filling plug 26 whereby the device may be charged with oil or the like.

The operation of the device is as follows: When the chassis and axle of the vehicle approach each other the piston 9 moves upwardly: i. e. toward the packing gland 20. In response to the rarefaction caused by this movement of the piston, the valve 15 rises against the pressure of its closing spring, thereby uncovering the apertures 16, and the fluid contained in the auxiliary chamber 18 is drawn freely through the passages 17 and apertures 16 into the lower end of the pressure chamber following the movement of the piston.

When however, the chassis and axle of the vehicle move away from each other the piston 9 is moved in the opposite direction. This results in the immediate closure of the valve 15, trapping the oil between this valve and the piston 9, and leaving as the only egress for the oil so trapped the passage 10 through the piston. As this passage may be restricted as desired, the rate of piston movement in this direction may be governed as necessary and thus the rate at which the chassis and the vehicle may move away from each other.

To prevent the chassis striking the axle, the movement of the piston 9 towards the gland 20 is retarded when and if the piston moves sufficiently far in this direction to cover the aperture 19. In this event oil would be compressed between the piston and the gland 20 without egress except between the gland and the piston rod 5 and past the packing ring 21 into the trap 24. Arrived in this trap the pressure of the oil is reduced so that instead of leaking between the piston rod 5 and the packing ring 22 it will return through the passages 25 to the auxiliary chamber 18.

Disposed between the piston rod head 6 and the end of the cylinder 1 is the pressure spring 27 which exerts a continuous pressure between the elements mentioned and maintains a continuous tension between the arms 3 and 4, the absorber casing 1 and all their connections with each other and with the parts of the vehicle. This prevents any rattling or looseness which may develop from wear or otherwise.

It will be observed that this shock absorber mechanism is exceedingly compact; that the absorber proper lies substantially in the plane of one of the arm members connecting it to the automobile; and that it consequently occupies a minimum of space. It will also be observed that the absorber proper is simple in construction, contains few operating parts, and those parts so disposed and constructed as to withstand all pressure and wear consequent upon operation; and that the absorber may be adjusted while in position without disassembly and without being disconnected from its associated elements.

Having described one specific embodiment of the invention, without limiting it thereto, I claim:

1. A shock-absorbing mechanism comprising in combination an arm pivotally attached at one end to the vehicle chassis or frame and provided with an integral angularly disposed extension at the opposite end, a pair of arms pivotally attached at one end to the vehicle axle and pivotally attached at their opposite ends to the first-named arm, a cylindrical hydraulic retarding member located between the pair of arms and pivotally attached to the vehicle axle and operatively connected to said extension of the first-named arm, and a pressure spring located between and exerting pressure upon said hydraulic retarding member and said extension.

2. A shock-absorbing mechanism comprising in combination an arm pivotally attached to the vehicle frame and provided with an extension, a pair of arms pivotally attached at one end to the vehicle axle and pivotally attached at their opposite ends to the first-named arm, a hydraulic retarding member located between the pair of arms, pivotally attached to the vehicle axle and operatively connected to said extension, and a spring located between and exerting pressure upon said retarding member and said extension.

3. A shock-absorbing mechanism comprising in combination an arm pivotally attached to the vehicle frame and provided with an extension, an arm pivotally attached at one end to the vehicle axle and pivotally attached at its opposite end to the first-named arm, a hydraulic retarding member pivotally attached to the vehicle axle and operatively connected to said extension, and a spring located between and exerting pressure upon said retarding member and said extension.

4. A shock-absorbing mechanism comprising in combination an arm pivotally attached to the vehicle frame, an arm pivotally attached at one end to the vehicle axle and pivotally attached at its opposite end to the first-named arm, a hydraulic retarding member pivotally attached to the vehicle axle and operatively connected to the first-named arm, and a spring located between and exerting pressure on said retarding member and said first-named arm.

5. A shock-absorbing mechanism comprising in combination an arm pivotally attached at one end to the vehicle frame and provided with an integral angularly disposed extension at its opposite end, a pair of arms pivotally attached at one end to the vehicle axle and pivotally attached at their opposite ends to the first-named arm, a hydraulic retarding member located between the pair of arms and substantially parallel thereto pivotally attached to the vehicle axle and operatively connected to said extension of the first-named arm.

6. A shock-absorbing mechanism comprising in combination an arm pivotally attached to the vehicle frame and provided with an extension, a pair of arms pivotally attached at one end to the vehicle axle and pivotally attached at their opposite end to the first-named arm, a hydraulic retarding member located between the pair of arms and substantially parallel thereto, pivotally attached to the vehicle axle and operatively connected to said extension.

7. A shock-absorbing mechanism comprising in combination an arm pivotally attached to the vehicle frame and provided with an extension, an arm pivotally attached at one end to the vehicle axle and pivotally attached at its opposite end to the first-named arm, and a hydraulic retarding member pivotally attached to the vehicle axle and operatively connected to said extension.

8. A shock-absorbing mechanism comprising in combination an arm pivotally attached to the vehicle frame, an arm pivotally attached at one end to the vehicle axle and pivotally attached at its opposite end to the first-named arm, and a hydraulic retarding member pivotally attached to the vehicle axle and operatively connected to said first-named arm and exerting a thrust against the axle and against the first named arm, the point of attachment to the vehicle frame and the point of attachment to the axle lying in the same vertical plane transverse to the vehicle.

9. A shock-absorbing mechanism comprising in combination an arm operatively connected to the vehicle frame, a second arm operatively connected with the first-named arm and with the vehicle axle, and a retarding member disposed substantially parallel to one of said arms and operatively interconnected therewith and with the other arm, the point of connection to the vehicle frame and the point of connection to the vehicle axle lying in substantially the same vertical line.

10. A hydraulic shock absorber comprising in combination a cylindrical casing, an inner cylinder therein spaced therefrom and concentric therewith to form an auxiliary chamber between said casing and said cylinder, a piston rod extending through the end of said casing and into said inner cylinder, a piston integral with said piston rod and thereby longitudinally movable within said cylinder, an unrestricted opening back of said piston between said auxiliary chamber and the interior of said cylinder, an adjustably restricted passage through said piston, adjusting means therefor extending through the piston rod so as to be externally accessible, a passage between said auxiliary chamber and the interior of said cylinder in front of said piston, valve means permitting free flow through said passage from said auxiliary chamber into the interior of said cylinder in front of said piston but adapted to prevent flow in the opposite direction whereby the movement of the piston in one direction is free and in the opposite direction retarded, a terminal collar forming in effect the rear end of said inner cylinder and surrounding said piston, an annular fluid-trapping chamber back of said collar and connecting with said auxiliary chamber, whereby any fluid forced past said terminal collar may return to said auxiliary chamber without further leaking past said piston.

11. A hydraulic shock absorber comprising in combination a cylindrical casing, an inner cylinder therein spaced therefrom and concentric therewith to form an auxiliary chamber between said casing and said cylinder, a piston rod extending through said casing into said cylinder, a piston operatively integral with said piston rod and longitudinally movable within said cylinder, an opening back of said piston between said auxiliary chamber and the interior of said cylinder, an adjustably restricted passage through said piston, adjusting means therefor accessible from outside the absorber, a passage between said auxiliary chamber and the interior of said cylinder in front of said piston, valve means permitting free flow therethrough in one direction but preventing flow in the opposite direction, and means to prevent leakage of contained fluid.

12. A hydraulic shock absorber comprising in combination a casing, a closed cylinder therein spaced therefrom to form an auxiliary chamber between said casing and said cylinder, a piston within said cylinder, an opening on one side of said piston between said auxiliary chamber and the interior of said cylinder, a passage through said piston, an opening on the other side of said piston between said auxiliary chamber and the interior of said cylinder, means for preventing flow in one direction through one of said openings, and means for restricting flow through said piston.

13. A hydraulic shock absorber comprising in combination a cylindrical casing, an inner cylinder therein spaced therefrom to form an auxiliary chamber between said casing and said cylinder, a piston longitudinally movable within said cylinder, an opening back of said piston between said auxiliary chamber and the interior of said cylinder, a passage through said piston, means for adjustably restricting the same, a passage between said auxiliary chamber and the interior of said cylinder in front of said piston, and means permitting free flow through said passage in one direction but preventing free flow in the opposite direction.

14. A hydraulic shock absorber comprising in combination a cylindrical casing, a cylinder therein concentric therewith and spaced therefrom to form a chamber between said casing and said cylinder, a piston longitudinally movable within said cylinder, an opening between said chamber and the interior of said cylinder for permitting fluid to flow therebetween as impelled by said piston, means to retard the movement of said piston in one direction and means for adjusting the retarding means.

15. A hydraulic shock absorber comprising in combination a casing, a closed cylinder therein spaced therefrom to form a chamber between said casing and said cylinder, a piston longitudinally movable within said cylinder, an opening between said chamber and the interior of said cylinder for permitting fluid to flow therebetween as impelled by said piston, and adjustable means to retard the movement of said piston in one direction.

16. A hydraulic shock absorber comprising in combination a pressure chamber, a piston movable within said pressure chamber, an auxiliary chamber, an unrestricted communication between said pressure and auxiliary chambers on one side of said piston, a passage connecting said pressure and auxiliary chambers on the other side of said piston adapted to permit free flow in one direction and to prevent flow in the opposite direction, and a manually adjustable passage through said piston whereby to control the movement thereof in one direction.

17. A hydraulic shock absorber comprising in combination a pressure chamber, a piston movable therein, an auxiliary chamber, unrestricted communication between said pressure and auxiliary chambers on one side of said piston, a passage connecting said pressure and auxiliary chambers on the other side of said piston adapted to permit free flow in one direction and to prevent flow in the opposite direction, and a passage permitting restricted flow from the pressure side of said piston to the other side thereof.

18. A hydraulic shock absorber comprising in combination a casing, a closed cylinder therein, an auxiliary chamber between said cylinder and said casing and in communication with the interior of said cylinder, a piston movable in said cylinder, means for retarding its movement in one direction and means accessible externally of the device for adjusting the retarding means.

19. A shock absorbing mechanism comprising, in combination, an arm pivotally attached to the vehicle frame, an arm pivotally attached at one end to the vehicle axle and pivotally attached at its opposite end to the first named arm, a hydraulic compression element pivotally attached to the axle and engaging the first mentioned arm, said compression element being readily extensible and having provision for retarding the compressive movement thereof.

20. A shock absorbing mechanism comprising, in combination, an arm pivotally attached to the vehicle frame, a pair of spaced arms pivotally attached at one end to the vehicle axle and pivotally attached at their opposite ends to the first-named arm, and a hydraulic compression element pivotally attached to the vehicle axle and connected to the first-named arm, said compression member being readily extensible but being provided with means for retarding the compressive movement thereof, together with a spring tending normally to extend said compression element.

21. A compression element for a shock absorber comprising a cylindrical casing, an inner cylinder therein spaced therefrom and concentric therewith to form an auxiliary chamber between said casing and said cylinder, a piston movable within said cylinder, a passage through said piston and means accessible exteriorly of the element for adjustably closing said passage.

22. A hydraulic shock absorber comprising in combination a casing 1, a closed cylinder 8 therein, an auxiliary chamber 18 between said cylinder and said casing and in communication with the interior of said cylinder 8 and a piston 9 movable in said cylinder, said piston having a restricted passage 10 for controlling the flow of liquid therethrough to retard the movement of the piston in one direction, and means accessible from the exterior of the cylinder for adjusting the opening of the restricted passage substantially as described.

In testimony whereof, I have signed my name to this specification this 15th day of August, 1922.

PORTER S. MORGAN.